(12) United States Patent
Xin

(10) Patent No.: US 10,339,786 B1
(45) Date of Patent: Jul. 2, 2019

(54) SAFETY REMINDING DEVICE AND METHOD BASED ON BICYCLE-SHARING

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yang Xin, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 58 days.

(21) Appl. No.: 15/871,136

(22) Filed: Jan. 15, 2018

(30) Foreign Application Priority Data

Dec. 21, 2017 (CN) .......................... 2017 1 1394907

(51) Int. Cl.
  *G08B 21/02* (2006.01)
  *G08B 21/22* (2006.01)
  *G01V 8/12* (2006.01)
  *G01K 13/00* (2006.01)
  *G07C 9/00* (2006.01)
  *G06K 7/14* (2006.01)

(52) U.S. Cl.
  CPC .............. *G08B 21/22* (2013.01); *G01K 13/00* (2013.01); *G01V 8/12* (2013.01); *G08B 21/02* (2013.01); *G06K 7/1417* (2013.01); *G07C 9/00182* (2013.01); *G07C 2009/00238* (2013.01)

(58) Field of Classification Search
  CPC ......... G08B 21/22; G08B 19/00; G08B 23/00
  See application file for complete search history.

*Primary Examiner* — Hongmin Fan
(74) *Attorney, Agent, or Firm* — ScienBiziP, P.C.

(57) ABSTRACT

A safety reminding device for a bicycle with a basket or other carrying structure includes a detecting unit to detect whether an object in the basket or other structure of a bicycle is a person when determining that the bicycle is unlocked. The device can output a warning signal when determining that a person is sitting in the basket, to warn the user that the basket is forbidden as a seat, and a server of this system can also impose penalties on the user, such as credit point deductions, and also apply the brakes of the bicycle braking system until the forbidden situation is ended. A safety reminding method is also provided.

13 Claims, 5 Drawing Sheets

SAFETY REMINDING DEVICE AND METHOD BASED ON BICYCLE-SHARING

CROSS-REFERENCE TO RELATED APPLICATIONS

This application claims priority to Chinese Patent Application No. 201711394907.0 filed on Dec. 21, 2017.

FIELD

The subject matter herein generally relates to safety devices applied in shared bikes, and particularly to a safety reminding device and method based on bicycle-sharing.

BACKGROUND

Bicycle-sharing is becoming more popular. However, when using a shared bicycle, a child should not sit in the bicycle's basket, because it is very dangerous.

BRIEF DESCRIPTION OF THE DRAWINGS

Implementations of the present technology will now be described, by way of example only, with reference to the attached figures.

DETAILED DESCRIPTION

Figure 1:
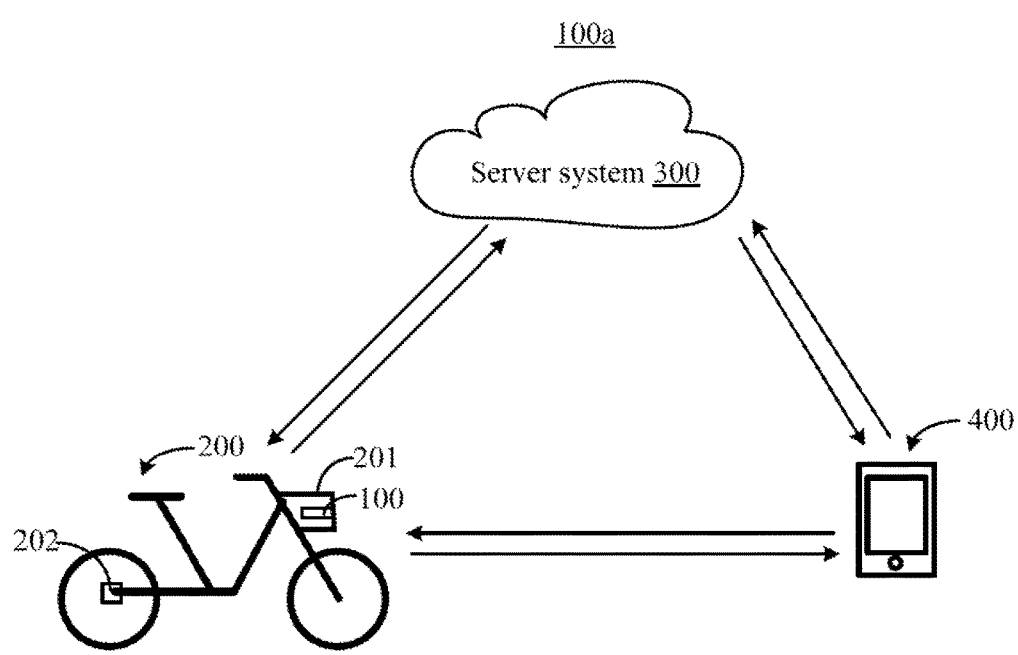
FIG. 1 is a block diagram illustrating an exemplary embodiment of an operating environment of a safety reminding device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series, and the like.

FIG. 1 illustrates an operating environment of a safety reminding device 100. The safety reminding device 100 can be used in, but is not limited to, a bicycle-sharing system 100a. The bicycle-sharing system 100a can include at least one bicycle 200, a server system 300, and at least one mobile device 400. The server system 300 communicates with the at least one bicycle 200 and the at least one mobile device 400. When a user using an application (such as Mobike® App) installed in the mobile device 400 to scan a Quick Response (QR) code of one bicycle 200, the mobile device 400 transmits the scanned information to the server system 300. The server system 300 transmits an unlock command to the bicycle 200 to unlock the bicycle 200. A basket 201 is mounted on the bicycle 200. The safety reminding device 100 is configured to detect whether a person is sitting in the basket 201 when the bicycle 200 is unlocked, and generate a warning signal when determining that there is a person sitting in the basket 201, to prompt the user that the basket 201 of the bicycle 200 is forbidden for passengers. The safety reminding device 100 further can transmit the warning signal to the server system 300 when determining that there is a person sitting in the basket 201, to cause the server system 300 to deduct credit points of the user and/or transmit a prompt message to the mobile device 400 of the user to prompt the user to pay more attention to safety on the road.

Figure 2:
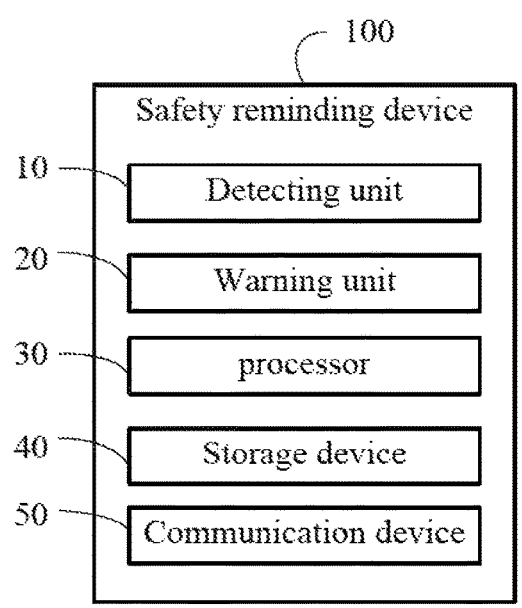
FIG. 2 is a block diagram illustrating an exemplary embodiment of the safety reminding device of FIG. 1.

FIG. 2 illustrates an exemplary embodiment of the safety reminding device 100. In the exemplary embodiment, the safety reminding device 100 includes a detecting unit 10, a warning unit 20, a processor 30, a storage device 40, and a communication device 50.

Figure 3:
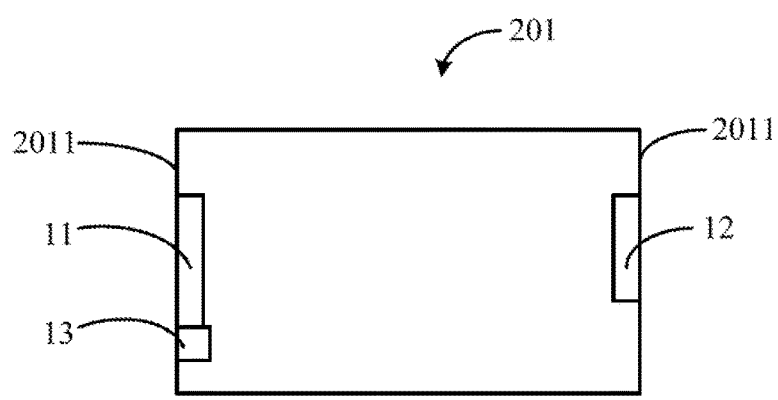
FIG. 3 is a schematic view illustrating an exemplary embodiment of the safety reminding device of FIG. 1 mounted on a bicycle's basket.

The detecting unit 10 can detect whether a person is sitting in the basket 201 of the bicycle 200 after the bicycle 200 is unlocked. In the exemplary embodiment, the detecting unit 10 is mounted on the basket 201 of the bicycle 200. The basket 201 includes four sidewalls 2011 (shown in FIG. 3). Referring to FIG. 3, in the exemplary embodiment, the detecting unit 10 includes an infrared transmitter 11, an infrared receiver 12, and a temperature sensor 13. The infrared transmitter 11 and the infrared receiver 12 are mounted on opposite sidewalls 2011 of the basket 201. The infrared transmitter 11, the infrared receiver 12, and the temperature sensor 13 are coupled to the processor 30. The infrared receiver 12 is configured to receive infrared rays transmitted by the infrared transmitter 11. If there is an object sitting in the basket 201, the infrared rays transmitted by the infrared transmitter 11 is blocked by the object, the infrared receiver 12 cannot receive the infrared rays. If the processor 30 determines that the infrared transmitter 11 transmits the infrared rays but there are no infrared rays received by the infrared receiver 12, the processor 30 controls the temperature sensor 13 to detect a temperature of the object in the basket 201. If the object's temperature detected by the temperature sensor 13 is within a preset temperature range, the processor 30 determines that the object in the basket 201 is a person. In the embodiment, the preset temperature range is roughly equal to a temperature range of a human body, for example 30°-40°. In the exemplary embodiment, the temperature sensor 13 can be disposed on the bottom of the basket 201 or one of the sidewall 2011 of the basket 201.

In an alternative embodiment, the detecting unit 10 can include a pressure sensor and a temperature sensor. If the object located in the basket 201 is a person, a certain pressure is applied on the bottom of the basket 201. The pressure sensor is disposed on the bottom of the basket 201 to detect the pressure on the basket 201. If the pressure value detected by the pressure sensor exceeds a preset pressure value, for example 10 kilograms, the processor 30 controls the temperature sensor to detect the temperature of the object, and determine that the object located in the basket 201 is a human being if the temperature detected by the temperature sensor is within the temperature range.

In other embodiments, the detecting unit 10 further can be an image capturing device (e.g. a camera) disposed in the basket 201 or a main body of the bicycle 200. The image capturing device can capture images of the basket 201. It is determined that an object in the basket is a person if the image contains a picture of such.

The warning unit 20 is configured to output a warning information when the detecting unit 10 detects that there is a person sitting in the basket 201, to prompt the user that the basket is forbidden as a seat for passengers. In the embodiment, the warning unit 20 can be, but is not limited to, a buzzer, a loudspeaker, a warning light, or a combination of the buzzer, the loudspeaker, and the warning light. In the embodiment, the warning unit 20 can be disposed on the basket 201 or other parts of the bicycle 200.

The processor 30 is coupled to the detecting unit 10 and the warning unit 20. In the exemplary embodiment, the processor 30 can be, but is not limited to, a central processing unit, a digital signal processor, or a single chip, for example. In the exemplary embodiment, the processor 30 can be a central processor of the safety reminding device 100, and also can be a processor of the bicycle 200.

The storage device 40 can be, but is not limited to, an internal storage system, such as a flash memory, a random access memory (RAM) for temporary storage of information, and/or a read-only memory (ROM) for permanent storage of information. The storage device 40 also can be an external storage system, such as a secure digital card.

The communication device 50 is configured to establish communication between the safety reminding device 100 and the mobile device 400 and the server system 300 via wireless networks, such as WIFI, BLUETOOTH®, and the like. The communication device 50 transmits a warning signal generated by the processor 30 to the server system 300 and/or the mobile device 400 when the detecting unit 10 detects that an object in the basket 201 is a person. The bicycle 200, the server system 300, and/or the mobile device 400 then prompt the user that the basket 201 is forbidden as a seat and prompt the user to pay attention to the safety.

In some embodiments, the communication device 50 can be omitted. In some other embodiments, the warning unit 20 can be omitted, and the communication device 50 can transmit the warning signal to the bicycle 200, the server system 300 and/or the mobile device e 400.

Figure 4:
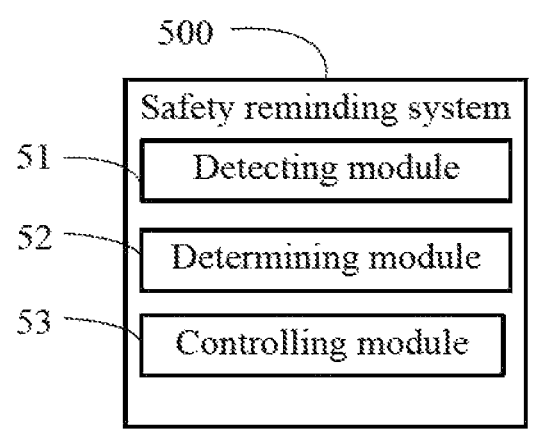
FIG. 4 is a block diagram illustrating an exemplary embodiment of a safety reminding system.

Referring to FIG. 4, a safety reminding system 500 runs in the safety reminding device 100. The safety reminding system 500 includes a number of modules, which are a collection of software instructions stored in the storage device 40 and are executed by the processor 30. In the exemplary, the safety reminding system 500 can include a detecting module 51, a determining module 52, and a controlling module 53.

The detecting module 51 is configured to detect when the bicycle 200 is unlocked, and then control the detecting unit 10 to detect whether an object in the basket 201 is a person. In the exemplary embodiment, the detecting module 51 detects whether the bicycle 200 is unlocked by detecting whether the bicycle 200 has received an unlock command from the server system 300. In the exemplary embodiment, the detecting module 51 controls the infrared transmitter 11 to transmits the infrared rays when determining that the bicycle 200 is unlocked, and determine whether the infrared receiver 12 receives any infrared rays. If determining that the infrared receiver 12 does not receive infrared rays, the detecting module 51 controls the temperature sensor 13 to detect the temperature of the object in the basket 201.

The determining module 52 is configured to receive detections from the detecting unit 10, and determine the nature of the object accordingly. In the exemplary embodiment, when the infrared receiver 12 receives the infrared rays transmitted by the infrared transmitter 11, the determining module 52 determines that the basket 201 is empty. When no infrared rays are received by the infrared receiver 12 and the temperature value detected by the temperature sensor 13 falls in the preset temperature range, the determining module 52 determines that the object in the basket 201 is a person. If the temperature is outside the preset temperature range, the determining module 52 determines that objects in the basket 201 are not a person. For example, there may be a bag of the user in the basket 201.

The controlling module 53 is configured to output the warning signal when the determining module 52 determines that there is a person sitting in the basket 201, to prompt the user that the basket is forbidden for sitting and prompt the user to pay more attention to the safety.

In the exemplary embodiment, the controlling module 53 outputs the warning signal via the warning unit 20 by controlling the warning unit 20 to output the warning signal, such as a buzzing alarm and/or a voice alarm. In the embodiment, the warning unit 20 outputs the warning signal for a preset time length, for example ten seconds. In an alternative embodiment, the warning unit 20 outputs the warning signal until the object which is determined as being a person is no longer sitting in the basket 201.

In the exemplary embodiment, the controlling module 53 further transmits the warning signal to the server system 300 via the communication device 50. The warning signal causes the server system 300 to transmit the prompt message to the mobile device 400 to prompt the user that the basket 201 of the bicycle 200 is forbidden for sitting. The server system 300 can impose penalty to punish the user such as by deducting credit points of the user who uses the bicycle 200.

In an alternative embodiment, the controlling module 53 further transmits the warning signal to the mobile device 400 via the communication device 50. The mobile device 400 outputs the warning signal, for example by using a display screen or a loudspeaker of the mobile device 400, to inform the user that the basket of the bicycle is not a seat for a passenger.

In at least one embodiment, the bicycle 200 further includes a braking system 202. The controlling module 53 is connected to the braking system 202, and controls the braking system 202 to brake the bicycle 200 when the determining module 52 determines that the object in the basket 201 is a person. The braking system 202 may be released when such determined object is no longer in the basket 201.

By executing the safety reminding system 500, safety reminders are outputted to the user when a person is found to be sitting in the basket 201 while the bicycle 200 is used, which improves the security of the bicycle 200.

Figure 5:
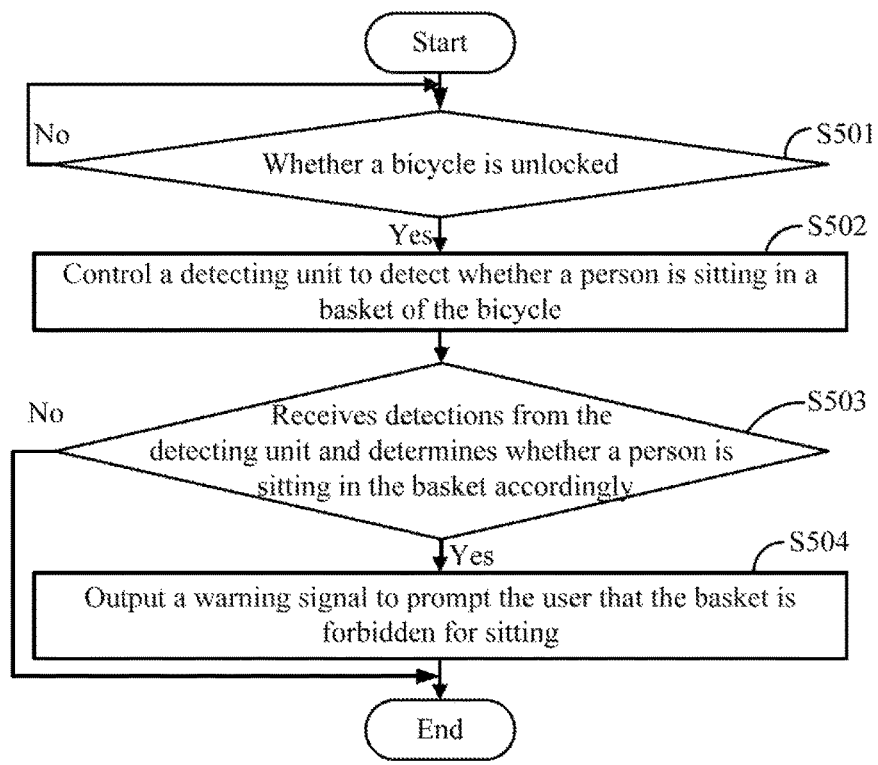
FIG. 5 is a flowchart illustrating an exemplary embodiment of a safety reminding method.

A method for forwarding a message is illustrated in FIG. 5. The method is provided by way of example, as there are a variety of ways to carry out the method. Each block shown in FIG. 5 represents one or more processes, methods, or subroutines carried out in the example method. Additionally, the illustrated order of blocks is by example only and the order of the blocks can be changed. The example method can begin at block S501.

At block S501, a detecting module detects whether a bicycle is unlocked, if yes, the procedure goes to block S502, otherwise, the procedure repeats the block S501. In the embodiment, the detecting module detects whether the bicycle is unlocked by detecting whether the bicycle has received an unlock command from a server system.

At block S502, the detecting module controls a detecting unit to detect whether a person is sitting in a basket of the bicycle.

In the embodiment, the detecting unit includes an infrared transmitter, an infrared receiver, and a temperature sensor. The infrared transmitter and the infrared receiver are respectfully mounted on two opposite sidewalls of the basket. The infrared receiver is configured to receive infrared rays transmitted by the infrared transmitter. The method for detecting whether an object in the basket is a person includes: controlling the infrared transmitter to transmit infrared rays; detecting whether the infrared receiver receives the infrared rays transmitted by the infrared transmitter; controlling the temperature sensor to detect a temperature of the object when determining that the infrared transmitter transmits the infrared rays but there is no infrared rays received by the infrared receiver. In an alternative embodiment, the detecting unit can include a pressure sensor and a temperature sensor. In other embodiments, the detecting unit further can be an image capturing device, such as a camera, configured to capture images of the basket.

At block S503, a determining module receives detections from the detecting unit and determines whether a person is sitting in the basket accordingly. If yes, the procedure goes to block S504, otherwise, the procedure is ended.

In the exemplary embodiment, the determining module determines that there is nobody sitting in the basket when determining that the infrared receiver receives the infrared rays transmitted by the infrared transmitter. The determining module determines that the object in the basket is a person when no infrared rays are received by the infrared receiver and the temperature value detected by the temperature sensor falls in a preset temperature range. The determining module further determines that the object in the basket is not a person when no infrared rays are received by the infrared receiver and the temperature value detected by the temperature sensor is outside the preset temperature range.

At block S504, a controlling module outputs the warning signal to prompt the user that the basket is forbidden for sitting.

In the exemplary embodiment, the controlling module outputs the warning signal via a warning unit by controlling the warning unit to output the warning signal, such as a buzzing alarm and/or a voice alarm. In the embodiment, the warning unit outputs the warning signal for a preset time length, for example ten seconds. In an alternative embodiment, the warning unit outputs the warning signal until the object which is determined as being a person is no longer sitting in the basket.

In the exemplary embodiment, the controlling module further transmits the warning signal to server system. The warning signal causes the server system to transmit a prompt message to a mobile device, which scans the QR code of the bicycle to unlock the bicycle, to prompt the user that the basket of the bicycle is forbidden for sitting, the server system further can impose penalty to punish the user such as by deducting credit points of the user who uses the bicycle.

In an alternative embodiment, the controlling module further transmits the warning signal to the mobile device which scans the QR code of the bicycle to unlock the bicycle. The mobile device outputs the warning signal, for example by using a display screen or a loudspeaker of the mobile device, to inform the user that the basket of the bicycle is forbidden for sitting.

In some embodiments, the bicycle further includes a braking system. The controlling module is connected to the braking system, controls the braking system to brake the bicycle when the determining module determines that object in the basket is a person, and controls the braking system release the bicycle when determining that the person is no longer in the basket.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A safety reminding device applied in a bicycle-sharing system, the bicycle-sharing system comprising at least one bicycle, the at least one bicycle comprising a basket, the safety reminding device comprising:
    a detecting unit to detect whether a person is sifting in the basket of the bicycle when the bicycle is unlocked;
    a processor; and
    a storage device storing one or more programs, when executed by the processor, the one or more programs cause the processor to:
    detect whether the bicycle is unlocked;
    control the detecting unit to detect whether a person is sifting in the basket of the bicycle when determining that the bicycle is unlocked;
    determine whether a person is sifting in the basket according to a detection of the detecting unit; and
    output a warning signal to inform a user that the basket is forbidden for sifting when determining that a person is sifting in the basket when the bicycle is unlocked.

2. The safety reminding device of claim 1, wherein the detecting unit comprises an infrared transmitter, an infrared receiver, and a temperature sensor; the infrared transmitter and the infrared receiver are respectfully mounted on opposite sidewalls of the basket; the infrared receiver is configured to receive infrared rays transmitted by the infrared transmitter; the temperature sensor is triggered to detect a temperature of an object in the basket when the infrared transmitter transmits the infrared rays but no infrared rays is received by the infrared receiver; and it is determined that the object in the basket is a person when no infrared rays is received by the infrared receiver and the temperature value detected by the temperature sensor is within a preset temperature range.

3. The safety reminding device of claim 1, wherein the safety reminding device further comprises a warning unit disposed on the bicycle, the warning signal is outputted by the warning unit.

4. The safety reminding device of claim 3, wherein the warning unit outputs the warning signal for a preset time length, or outputs the warning signal until the person no longer sifting in the basket.

5. The safety reminding device of claim 1, wherein the bicycle-sharing system further comprises a server system and at least one mobile device, the safety reminding device further comprises a communication device to communicate with the server system and the mobile device, the one or more programs further cause the processor to transmit the warning signal to the server system to cause the server system to transmit a prompt message to the mobile device, which scans a QR code of the bicycle to unlock the bicycle, to prompt the user that the basket of the bicycle is forbidden for sifting, and further cause the server system to deduct credit points of the user who use the bicycle.

6. The safety reminding device of claim 1, wherein the bicycle-sharing system further comprises at least one mobile device, the safety reminding device further comprises a communication device to communicate with the at least one mobile device, the one or more programs further cause the processor to transmit the warning signal to the mobile device, which scans a QR code of the bicycle to unlock the bicycle, to cause the mobile device to output the warning signal to inform the user that the basket of the bicycle is forbidden for sifting.

7. The safety reminding device of claim 1, wherein the processor is connected to a braking system of the bicycle, the one or more programs further cause the processor to control the braking system to brake the bicycle when determining that there is a person sifting in the basket, and control the braking system releases the bicycle when the person is no longer sifting in the basket.

8. A safety reminding method applied in a bicycle-sharing system, the bicycle-sharing system comprising at least one bicycle, the at least one bicycle comprising a basket, the safety reminding method comprising:
   detecting whether the bicycle is unlocked;
   determining whether a person is sifting in the basket of the bicycle after determining that the bicycle is unlocked; and
   outputting a warning signal when determining that a person is sifting in the basket after the bicycle is unlocked.

9. The safety reminding method of claim 8, wherein the bicycle comprises a detecting unit, the detecting unit comprises infrared transmitter, an infrared receiver, and a temperature sensor; the infrared transmitter and the infrared receiver are respectfully mounted on opposite sidewalls of the basket; the infrared receiver is configured to receive infrared rays transmitted by the infrared transmitter; the method for detecting whether a person is sifting in the basket of the bicycle comprises:
   controlling the infrared transmitter to transmit infrared rays;
   detecting whether the infrared receiver receives the infrared rays transmitted by the infrared transmitter;
   controlling the temperature sensor to detect a temperature of an object in the basket when determining that the infrared transmitter transmits the infrared rays but no infrared rays is received by the infrared receiver; and
   determining that there is a person sifting in the basket when no infrared rays is received by the infrared receiver and the temperature value detected by the temperature sensor is within a preset temperature range.

10. The safety reminding method of claim 8, wherein the warning signal is outputted for a preset time length or is outputted until the person is no longer sitting in the basket.

11. The safety reminding method of claim 8, wherein the bicycle-sharing system further comprises a server system and at least one mobile device, the method further comprises:
   transmitting the warning signal to the server system to cause the server system to transmit a prompt message to the mobile device which scans a QR code of the bicycle to unlock the bicycle, and further cause the server system to deduct credit points of the user using the bicycle.

12. The safety reminding method of claim 8, wherein the bicycle-sharing system further comprises at least one mobile device, the method further comprises:
   transmitting the warning signal to the mobile device, which scans a QR code of the bicycle to unlock the bicycle, to cause the mobile device to output the warning signal to prompt the user that the basket of the bicycle is forbidden for sit.

13. The safety reminding method of claim 8, wherein the method further comprises:
   controlling a braking system of the bicycle to brake the bicycle when determining that there is a person sifting in the basket; and
   controlling the braking system to release the bicycle when the person is no longer sifting in the basket.

* * * * *